United States Patent [19]

Van Slyke

[11] Patent Number: 5,020,595

[45] Date of Patent: Jun. 4, 1991

[54] CARBON DIOXIDE-STEAM CO-INJECTION TERTIARY OIL RECOVERY PROCESS

[75] Inventor: Donald C. Van Slyke, Brea, Calif.

[73] Assignee: Union Oil Company of California, Los Angeles, Calif.

[21] Appl. No.: 379,623

[22] Filed: Jul. 12, 1989

[51] Int. Cl.$^5$ ............................................. E21B 43/24
[52] U.S. Cl. .................................. 166/272; 166/270; 166/273; 166/275; 166/300; 166/303; 166/902
[58] Field of Search ............... 166/268, 270, 272, 273, 166/275, 279, 300, 303, 306, 902

[56] References Cited

U.S. PATENT DOCUMENTS

| | | | |
|---|---|---|---|
| 3,908,762 | 9/1975 | Redford | 166/26.3 |
| 3,948,323 | 4/1976 | Sperry et al. | 166/303 |
| 4,044,831 | 8/1977 | Allen | 166/275 |
| 4,217,956 | 8/1980 | Goss et al. | 166/272 |
| 4,223,730 | 9/1980 | Schulz et al. | 166/272 |
| 4,441,555 | 4/1984 | Shu | 166/272 |
| 4,475,595 | 10/1984 | Watkins et al. | 166/303 |
| 4,523,642 | 6/1985 | Venkatesan | 166/272 |
| 4,549,609 | 10/1985 | Watkins et al. | 166/303 |
| 4,572,296 | 2/1986 | Watkins | 166/303 |
| 4,589,487 | 5/1986 | Venkatesan et al. | 166/261 |
| 4,609,044 | 9/1986 | Lau | 166/270 |
| 4,660,641 | 4/1987 | Shen | 166/272 |
| 4,702,317 | 10/1987 | Shen | 166/272 |
| 4,714,112 | 12/1987 | Nigrini et al. | 166/252 |
| 4,719,972 | 1/1988 | Hsueh | 166/252 |
| 4,802,533 | 2/1989 | Hsueh et al. | 166/252 |
| 4,813,483 | 3/1989 | Ziegler | 166/274 |

OTHER PUBLICATIONS

Van Poollen et al., Fundamentals of Enhanced Oil Recovery, Penwell Books, Tulsa, OK (1980) pp. xiv–xv and 132–145.
Miller et al., SPE/DOE 9789 (1981).
De Waard et al., *Corrosion-NACE*, 31 (5): 177–181 (May 1975).
Redford, *J. Canadian Petroleum Technology*, Jan.-Feb. 1982, Montreal, pp. 45–43.
Hong et al., *J. Petroleum Technology*, Dec., 1984, pp. 2160–2170.
Simon et al., *J. Petroleum Technology*, Jan. 1965, pp. 102–106.
Stone et al., *J. Canadian Petroleum Technology*, Nov.–Dec. 1985, Montreal, pp. 51–59.
Harding et al., *J. Canadian Petroleum Technology*, Sep.-Oct. 1983, Montreal, pp. 30–37.
Rhodes et al., *Ind. and Eng'g. Chemistry*, 28 (9):1078–1079 (1936).
Ellis, *American J. Science*, 257: 217–234 (1959).
Ellis et al., *American J. Science*, 261: 47–60 (1963).

Primary Examiner—Bruce M. Kisliuk
Assistant Examiner—Roger J. Schoeppel
Attorney, Agent, or Firm—Gregory P. Wirzbicki; Shlomo R. Frieman

[57] ABSTRACT

A composition for use in enhanced oil recovery procedures comprises steam, carbon dioxide, carbonic acid, and a corrosion inhibitor. In one version of the invention, the corrosion inhibitor is a carbonate-containing buffering agent and in another version of the invention, the corrosion inhibitor is a pH-adjusting agent.

32 Claims, 1 Drawing Sheet

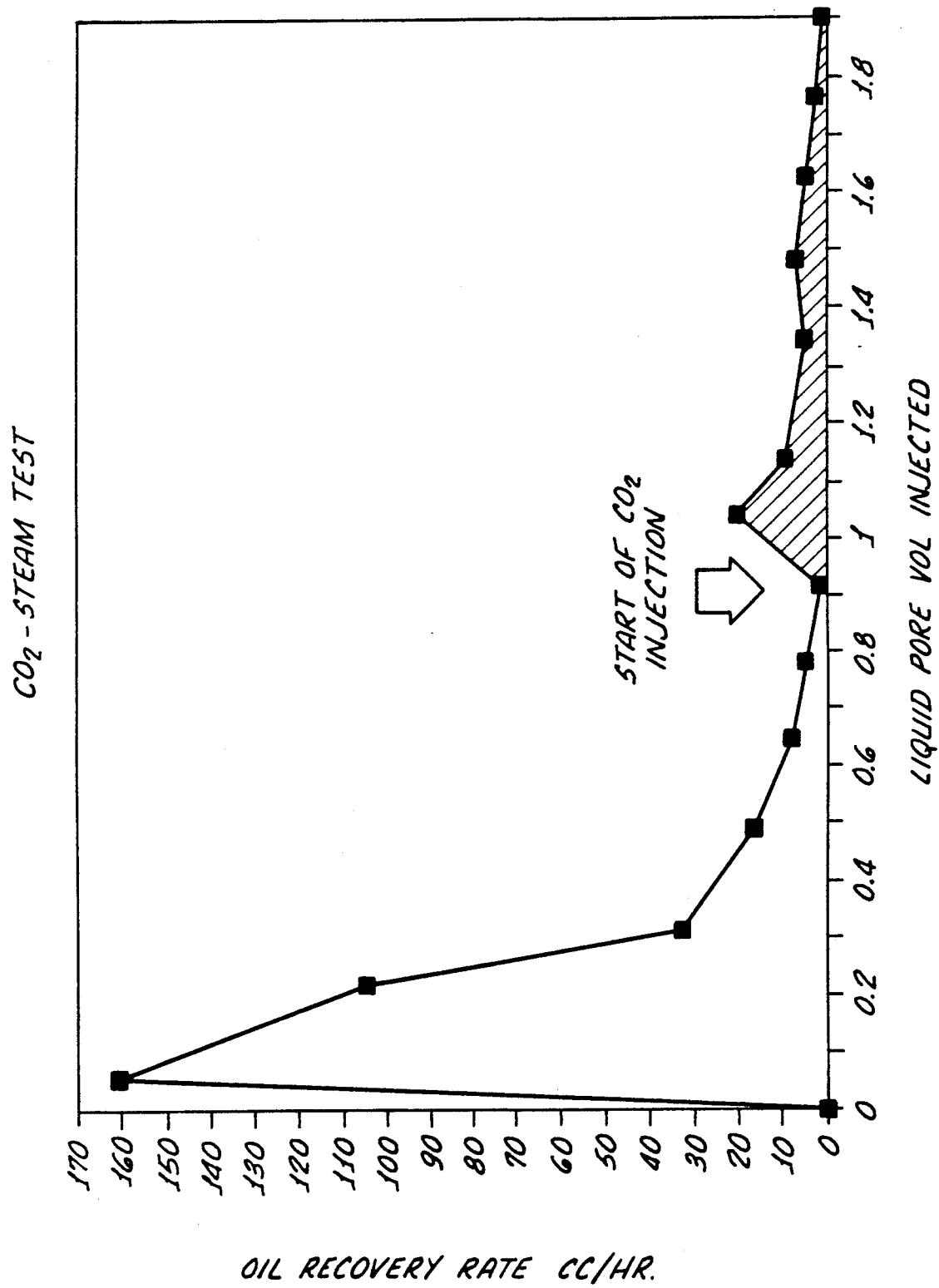

CARBON DIOXIDE-STEAM CO-INJECTION TERTIARY OIL RECOVERY PROCESS

BACKGROUND

The present invention relates to tertiary oil recovery processes, compositions for use therein, and an oil recovery system treated therewith.

Carbon dioxide has been used in secondary oil recovery processes. These secondary recovery processes entail injecting water containing carbon dioxide into an oil-bearing formation in order to increase the recoverable amount of oil from the formation. Because of insufficient transfer of carbon dioxide from the water to the oil, attempts have been made to increase the solubility, and therefore the concentration, of carbon dioxide in the water.

In addition, carbon dioxide has been co-injected with steam in tertiary oil recovery processes. Although the amount of carbon dioxide available for transfer to the oil is high, these tertiary process are unsatisfactory because well tubing and other oil recovery equipment are corroded by contact with the steam-carbon dioxide mixture.

SUMMARY OF THE INVENTION

The present invention provides a composition having a substantially reduced corrosion propensity. The composition comprises (a) steam, (b) carbon dioxide, (c) carbonic acid, and (d) a corrosion inhibitor. In one version of the invention, the corrosion inhibitor is a carbonate-containing buffering agent and is present in the composition in a concentration sufficient to form a buffer solution with the carbonic acid. In another version of the invention, the corrosion inhibitor is a pH adjusting agent that is present in the composition in an amount sufficient for the composition to have a pH of at least about 5.3.

In addition to the composition, the present invention also provides (a) a process for recovering oil from an oil-bearing formation and (b) a natural resource (e.g., oil) recovery system. The oil recovery process comprises the steps of (a) injecting the composition into at least a portion of an oil-bearing formation, and (b) withdrawing oil from the oil-bearing formation.

The natural resource recovery system comprises (a) a natural resource-bearing formation, (b) a well penetrating the formation, and (c) the composition present in at least a portion of the well.

DRAWING

The reduced corrosion potential of the composition of the instant invention and the increase in recoverable oil made possible by the use of the composition in a tertiary oil recovery process as well as other features, aspects, and advantages of the present invention will become better understood with reference to the following description, appended claims, and accompanying drawing wherein the sole figure is a graph depicting the oil recovery rate versus pore volumes of injected steam liquid phase experimentally obtained in Example 16.

DETAILED DESCRIPTION OF THE INVENTION

The composition of the present invention comprises steam, carbon dioxide, carbonic acid, and a corrosion inhibitor. Generally, the steam has a steam quality of at least about 10 weight percent and typically less than about 90 weight percent. Preferably, the steam has a steam quality of about 20 to about 85 weight percent, and more preferably about 40 to about 60 weight percent.

With respect to carbon dioxide, the composition generally comprises a concentration of carbon dioxide sufficient to increase the amount of oil recoverable from a formation when compared to the amount of oil recoverable from the formation by a similar composition devoid of carbon dioxide. Generally, the composition comprises at least about 50 standard cubic feet (scf) carbon dioxide per barrel of steam cold water equivalent, i.e., per amount of steam generated from one barrel of cold water. Preferably, the composition comprises about 50 to about 500 scf carbon dioxide per barrel of steam cold water equivalent.

When steam has a steam quality of less than 100 weight percent, the steam comprises a vapor phase and a liquid phase. A portion of the carbon dioxide present in steam having a steam quality of less than 100 weight percent dissolves in the liquid phase of the steam and forms carbonic acid according to the following reaction:

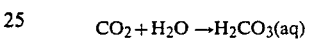

$$CO_2 + H_2O \rightarrow H_2CO_3(aq)$$

The total solubility of the carbon dioxide in the steam liquid phase can be calculated by techniques known to those skilled in the art. See, for example Ellis, *American Journal of Science*, 257: 217–234 (1959) and Ellis et al., *American Journal of Science*, 261: 47–60 (1963), these publications being incorporated herein in their entirety by reference. However, of the total concentration of carbon dioxide solubilized in the steam liquid phase, about 99.63 percent is present in the form of carbon dioxide molecules and only about 0.37 percent is actually carbonic acid. Therefore, the concentration of carbonic acid present in the composition is 0.0037 times the molar concentration of the carbon dioxide in the steam liquid phase.

The corrosion inhibitor is any material that reduces the corrosion potential of the composition. In one embodiment of the invention, the corrosion inhibitor is a carbonate-containing buffering agent. Exemplary carbonate-containing buffering agents include, but are not limited to, alkali metal carbonates, alkali metal bicarbonates, alkaline metal carbonates, alkaline metal bicarbonates, alkaline earth metal carbonates, alkaline earth metal bicarbonates, ammonium carbonate, and ammonium bicarbonate. Typical carbonates include ammonium, sodium, potassium, rubidium, lithium, cesium, beryllium, barium, magnesium, calcium, and strontium carbonates. Typical bicarbonates include sodium, potassium, lithium, rubidium, cesium, ammonium, and francium bicarbonates. Preferably, the buffering agent is selected from the group consisting of sodium carbonate, sodium bicarbonate, potassium carbonate, potassium bicarbonate, ammonium carbonate, and ammonium bicarbonate. Due to cost and commercial availability, sodium carbonate and sodium bicarbonate are the most preferred buffering agents. However, a mixture of two or more of the buffering agents can also be used.

The concentration of the buffering agent in the composition is generally sufficient to substantially reduce the composition's corrosion potential. In order to substantially reduce the composition's corrosion potential, the ratio of carbonic acid to buffering agent or salt concentration as well as the concentration of the carbonic acid in the composition is preferably sufficient to form a buffer solution. A buffer solution is formed when the ratio of carbonic acid to buffering agent is from about 0.1:1 to about 10:1, and the absolute concentration of the carbonic acid in the composition is at least about 4 times its dissociation constant (namely, at least about 4 times $4.2 \times 10^{-7}$). Preferably, the absolute concentration of the carbonic acid in the composition is preferably at least about 10 times its dissociation constant.

A stoichiometric buffer solution is formed when equivalent molar concentrations of carbonic acid and buffering agent are present in the composition. For example, in the case of a carbonate-containing buffering agent, a stoichiometric buffer solution exists when equal molar concentrations of carbonic acid and the carbonate-containing buffering agent are present in the composition. A composition containing a carbonate-containing buffering agent in a concentration sufficient to form a stoichiometric buffer solution has a pH of about 6.3 to about 6.4.

Typically, the buffering agent is present in the composition in a concentration generally at least about 70 percent of that necessary to form a stoichiometric buffer solution. Preferably, the composition contains a buffering agent concentration sufficient to form a stoichiometric buffer solution. (A composition containing a carbonate-containing buffering agent in a concentration sufficient to form a 200 percent stoichiometric buffer solution has a pH of about 6.6 to about 6.7.) However, since the preferred buffering agents are inexpensive, it is desirable to use a concentration of the buffering agent greater than that required to form a stoichiometric buffer solution, e.g., at least about 110 percent, more preferably at least about 150 percent, and most preferably at least about 200 percent of the buffering agent concentration necessary to form a stoichiometric buffer solution.

Nevertheless, the concentration of buffering agent employed can be much higher, e.g., about 500 percent of that necessary to form a stoichiometric buffer solution because no significant change in corrosion potential reduction of the composition occurs in compositions containing higher concentrations of buffering agent. Preferably, the concentration of the buffering agent in the composition is less than about 400 percent, and more preferably less than about 300 percent, of that necessary to form a buffer solution.

In another embodiment of the present invention, the corrosion inhibitor is a pH adjusting agent. Exemplary pH adjusting agents include organic and inorganic bases. Both strong and weak bases can be used, the strong bases being preferred because of cost considerations. Typical bases include, but are not limited to, ammonia, urea, hydroxide-containing compounds (e.g., sodium hydroxide, ammonium hydroxide), amine-containing compounds (e.g., methylamine, phenylethylamine), phosphate-containing compounds (e.g., magnesium phosphate, calcium phosphate), as well as the pH-adjusting agents disclosed in U.S. Pat. No. 4,475,595; U.S. Pat. No. 4,549,609; U.S. Pat. No. 4,572,296; U.S. Pat. No. 4,714,112, and U.S. Pat. No. 4,802,533, these patents being incorporated herein in their entirety by reference.

Generally, the pH adjusting agent is present in the composition in a concentration sufficient to neutralize the majority of the carbonic acid present in the composition. Typically, the pH-adjusting agent is present in the composition in a concentration sufficient to raise the pH of the composition to at least about 5.3, preferably to within a range of about 5.5 to about 8, more preferably to within a range of about 6 to about 7.5, and most preferably to within about 6.3 to about 7.

Because raising the pH of the composition with a pH-adjusting agent may cause precipitation of dissolved solids, it is preferred to use a pH-adjusting agent with a feedwater that is low in dissolved salts, i.e., clean water as opposed to brackish water.

The amount of corrosion inhibitor to be added to achieve the desired buffering agent or pH adjusting agent concentration in the composition is determinable in several ways. For all types of feedwater used to generate steam, the amount of corrosion inhibitor can be determined either empirically or by modeling the system using software such as Electrochem or Scalechem scale and pH prediction simulator software available from Oli Systems, Inc.

To empirically determine the amount of corrosion inhibitor to add to the composition, a pH probe is used to monitor the pH of the steam-carbon dioxide mixture, and the buffering agent or pH adjusting agent is added to the mixture at a rate sufficient to maintain the pH of the mixture at the desired level.

For feedwater having a low total dissolved salt content, the amount of corrosion inhibitor to be added can be calculated using ionization constants in the case of pH adjusting agents or by using the calculations demonstrated in Example 17, infra, in the case of buffering agents.

Other ingredients are optionally present in the composition. For example, a surfactant or foaming agent can be present in the composition when it is desirable to employ the composition in a steam foam flood. However, when not employed in a steam foam flood, it is preferred that the composition have a foaming agent concentration less than about 0.01 weight percent, more preferably less than about 0.005 weight percent, and most preferably less than about 0.001 weight percent. In fact, in order to reduce the cost of the composition, the composition is preferably substantially devoid of a surfactant or foaming agent.

The composition of the present invention is prepared by heating feedwater in a steam generator or other similar device to generate steam. The corrosion inhibitor is injected either into the feedwater upstream from the steam generator or into the steam downstream from the steam generator. To avoid exposing the steam generator to the carbon dioxide, the carbon dioxide is preferably injected into the steam downstream from the steam generator and more preferably at or downstream from the corrosion inhibitor injection location. However, the corrosion inhibitor and carbon dioxide are usually injected into the steam prior to the steam entering an injection well.

The compositions of the present invention can be employed in various enhanced oil recovery procedures. The composition can be use to increase the amount of oil recoverable from formations containing various grades of oil. Typically, the formations treated with the composition contain an oil having an API gravity less than about 30°. However, it is preferred to use the composition to treat formations containing less than about 25°, more preferably about 15°, and even less than about 10° API gravity oil.

In one version of the invention, a composition, preferably substantially devoid of a foam-forming concentration of a surfactant, is employed in a continuous or cyclic steam-carbon dioxide co-injection procedure. Generally, a carbon dioxide-steam cyclic enhanced oil recovery process embodying features of the present invention entails injecting the composition into a well that penetrates at least one oil-bearing formation. The composition is injected into at least a portion of the oil-bearing formation. Preferably, the composition is shut into the well for a period of time, generally ranging from about 1 to about 2 weeks. Subsequent to the shut-in, oil is withdrawn from the oil-bearing formation through substantially the same well.

In a continuous carbon dioxide-steam process embodying features of the present invention, the composition is injected into an oil-bearing formation through an injection well and the oil is withdrawn from the oil-bearing formation through a recovery well that penetrates the same oil-bearing formation. In an alternative embodiment of the process of the present invention, the injection of the composition of the present invention is preceded by the injection of substantially pure steam into at least a portion of the formation.

In another embodiment of the invention, when a foam-forming amount of a surfactant is present in the composition, the composition can be employed in continuous and cyclic steam-foam drive enhanced oil recovery procedures. Typical continuous and cyclic steam foam drive enhanced oil recovery procedures are well known to those skilled in the art. See, for example, U.S. Pat. No. 4,702,317, the patent being incorporated herein in its entirety by reference.

The amount of the composition injected into the formation and the rate at which the composition is injected into the formation are site specific. Typically, the amount of the composition injected into the formation is at least about 100 barrels of feedwater. However, less than about 10,000 barrels of feedwater are generally injected. Preferably, the amount of feedwater injected is between about 250 to about 5,000 barrels, and more preferably about 1,000 to about 2,000 barrels of feedwater.

Usually, the composition is injected at a rate of at least about 100 barrels per day of steam cold water equivalent. Preferably, the injection rate is about 100 to about 1,000 barrels per day, and more preferably about 300 to about 700 barrels per day, of steam cold water equivalent.

The amount and rate of carbon dioxide injection are also site specific. Preferably, the carbon dioxide is injected at a rate of at least about 5,000 scf per day and preferably at a rate of about 5,000 to about 500,000 scf per day.

Generally, the use of the present composition in a tertiary oil recovery procedure obviates treating the oil-bearing formation with a caustic solution such as an aqueous solution containing one or more inorganic, water-soluble salts of carbonic acid. For example, the composition of the present invention is typically injected into the oil-bearing formation prior to injecting about 0.2 pore volume of an aqueous solution containing a minimum concentration of about 1 weight percent of at least one inorganic, water-soluble salt of carbonic acid. In fact, the composition is preferably injected into the formation prior to injecting 0.02, and more preferably 0.002 pore volume of aqueous solution. Furthermore, the composition of the present invention is injected into the oil-bearing formation prior to injecting an aqueous solution that contains a minimum concentration of about 0.1 weight percent, and more preferably a minimum concentration of about 0.01 weight percent, of an inorganic, water-soluble salt of carbonic acid.

EXAMPLES

The following examples demonstrate that the composition of the present invention (a) reduces corrosion when employed in an oil recovery procedure, and (b) enhances the amount of oil recoverable from an oil-bearing formation. In addition, one of the examples shows that the composition and procedure of the present invention are cost effective in recovering oil from an oil-bearing formation.

EXAMPLES 1-15

Carbon Dioxide Corrosion Reduction

Experimental Procedure

A glass-lined, one-gallon stainless steel autoclave was used to create the desired temperature and pressure conditions. Carbon dioxide could be injected through a port on the autoclave. A mechanical stirrer was used to establish the desired flow conditions.

A coupon was positioned within the autoclave parallel to the direction that the water would flow in the autoclave. The coupon was prepared from a 1 inch by 1.5 inch rectangular section of a piece of 5-inch diameter N-80 carbon steel pipe. In all the experimental runs, the coupon was positioned so that the top of the coupon was about $\frac{1}{8}$ inch above the gas-liquid interface under stagnant conditions. When the stirrer was on, the interface was located about half-way up the face of the coupon.

A stirrer speed of about 1,050 rpm was used in all runs. The speed corresponded to a local velocity of about 7.5 feet per second at the coupon position.

The coupon preparation was identical in each run. First, the coupons were filed smooth and sanded with fine-grade emery paper. After a thorough cleaning with distilled water and acetone, the coupons were briefly immersed in about 4.5 percent HCl to remove any remaining loose material. The coupons were then dried, carefully weighed, and measured with a caliper.

Once prepared, the coupon was bolted to a rack with spacers (made from tetrafluoroethylene fluorocarbon polymer) separating the coupon from the metal surface of the rack. The rack and the coupon were placed inside the glass liner and positioned in the autoclave. Simulated brine (about 0.1 M NaCl) was poured into the autoclave and the lid of the autoclave was secured. The autoclave was purged with carbon dioxide for about 15 minutes before starting the run. After purging, the desired carbon dioxide quantity was injected into the autoclave. The stirrer motor was turned on and heat was supplied to bring the temperature within the autoclave up to about 500° F. as rapidly as possible without overheating. The designated start-of-run was the moment that the autoclave reached about 500° F. Most of the runs lasted overnight (usually about 16 to about 18 hours).

After the desired run length was achieved in each trial, the heat was turned off and the autoclave was cooled with the stirrer still on. After about 5 to about 6 hours, when the temperature had dropped to about 150° F., the unit was depressurized and the coupon was removed.

The coupon was cleaned by immersing it in about a liter of boiling sodium hydroxide solution (about 20% sodium hydroxide) containing about 30 grams of zinc powder. The action of hydrogen bubbles emanating from the zinc helped to loosen the corrosion products from the coupon. A wire brush was then used to thoroughly scrub the coupon. After rinsing and drying, the coupon was weighed to determine the corrosion expressed in units of grams of weight lost per square inch of original surface area. By knowing the total run length at about 500° F., the corrosion rate expressed in mils per year was calculated using the formulas $$\text{mils penetration} = \frac{(\text{weight loss, gms})(7.86)}{(\text{original surface area, in}^2)}$$

$$\text{mils/yr penetration} = \frac{(\text{Corrosions, mils penetration})(8,766 \text{ hrs/yr})}{(\text{run length, hrs})}$$

Discussion of Results

The experimental results are summarized in the following Table I.

TABLE I
$CO_2$ Corrosion Mitigation

| Run | Buffering Agent | Buffer Concentration, ppm | Gas Charge, scf | Temp., °F. | Pres., psia | Time, Hours | Corrosion Rate, Mils/Yr | pH[a] |
|---|---|---|---|---|---|---|---|---|
| 1 | None | — | 0.74 $CO_2$ | 470 | 610 | 19.3 | 152.3 | NA[b] |
| 2 | None | — | 0.74 $CO_2$ | 500 | 730 | 18.0 | 196.0 | NA |
| 3 | $NaHCO_3$ | 500 | 0.74 $CO_2$ | 500 | 755 | 18.5 | 38.4 | NA |
| 4 | None | — | 0.74 $CO_2$ | 500 | 740 | 17.0 | 155.5 | NA |
| 5 | NaOH | 500 | 0.74 $CO_2$ | 500 | 740 | 17.5 | 29.8 | NA |
| 6 | $Na_2CO_3$ | 500 | 0.74 $CO_2$ | 500 | 740 | 16.0 | 35.1 | NA |
| 7 | $NaHCO_2$ | 500 | 0.74 $CO_2$ | 500 | 760 | 17.8 | 72.2 | NA |
| 8 | None | — | 0.74 $N_2$ | 500 | 745 | 18.0 | 32.6 | NA |
| 9 | $Na_2CO_3$ | 1,000 | 0.74 $CO_2$ | 500 | 735 | 18.3 | 19.2 | 6.15 |
| 10 | $Na_2CO_3$ | 100 | 0.74 $CO_2$ | 500 | 735 | 20.5 | 47.6 | 5.65 |
| 11 | None | — | 0.22 $CO_2$ | 500 | 660 | 18.8 | 80.6 | 5.05 |
| 12 | $Na_2CO_3$ | 100 | 0.22 $CO_2$ | 500 | 670 | 18.5 | 29.7 | 5.30 |
| 13 | $Na_2CO_3$ | 31.8 | 0.22 $CO_2$ | 500 | 655 | 16.5 | 17.5 | 4.65 |
| 14 | None | — | 0.22 $N_2$ | 500 | 665 | 19.0 | 8.1 | 7.05 |
| 15 | $Na_2CO_3$ | 10 | 0.22 $CO_2$ | 500 | 675 | 17.5 | 174.5 | 4.90 |

[a]pH obtained after cooling autoclave to about 150° F. and depressurizing autoclave.
[b]NA denotes "not available."

The amount of carbon dioxide corrosion that was obtained using an approximately 0.74 scf initial carbon dioxide charge and parallel coupon orientation was about 176 mils per year (average of runs 2 and 4).

Identical strengths (about 500 ppm) of four different buffering agents were used in runs 3, and 5-7 to compare their relative abilities to reduce carbon dioxide corrosion. Each buffering agent was mixed with a separate brine solution prior to purging the autoclave with carbon dioxide. At the concentration tested, sodium carbonate, sodium bicarbonate, and sodium hydroxide were each about equally effective in reducing corrosion (about 35.1 mils/yr, about 38.4 mils/yr, and about 29.8 mils/yr, respectively).

Sodium carbonate was the preferred buffering agent because it resulted in comparable or better corrosion reduction than the other buffering agents tested, and it could be obtained at a lower cost (about $0.06/lb for sodium carbonate versus about $0.20/lb for sodium hydroxide and sodium bicarbonate). More sodium carbonate (about 1,000 ppm) resulted in better corrosion reduction (from about 176 to about 19.2 mil/yr), and less sodium carbonate (about 100 ppm) resulted in less corrosion reduction (from about 176 to about 47.6 mil/yr with the approximately 0.74 scf carbon dioxide charge).

Blank runs with equivalent amounts of nitrogen in place of carbon dioxide revealed significant amounts of background corrosion inherent in the experiment. These tests showed corrosion rates of about 8.1 mils/yr at the lower nitrogen concentration and about 32.6 mils/yr at the higher concentration. This corrosion was probably caused by the sodium chloride and/or any oxygen that may have remained inside the autoclave after deaeration. Subtracting out this background effect gave a corrected corrosion rate which is a better representation of the corrosion caused by carbon dioxide alone. The corrected incremental corrosion rates for the sodium carbonate runs are listed in the following Table II.

TABLE II
Corrected $CO_2$ Corrosion Rates Using $Na_2CO_3$ Buffer

| Run | $CO_2$ Charge scf | $Na_2CO_3$ Concentration, ppm | Temp., °F. | Pres., psia | Corrected Corrosion Rate, Mils/Yr |
|---|---|---|---|---|---|
| 2 | 0.74 | 0 | 500 | 730 | 163.4 |
| 4 | 0.74 | 0 | 500 | 740 | 122.0 |
| 10 | 0.74 | 100 | 500 | 735 | 15.0 |
| 6 | 0.74 | 500 | 500 | 740 | 2.5 |
| 9 | 0.74 | 1,000 | 500 | 735 | 0 |
| 11 | 0.22 | 0 | 500 | 660 | 72.5 |
| 15 | 0.22 | 10 | 500 | 675 | 166.4 |
| 13 | 0.22 | 31.8 | 500 | 655 | 9.4 |
| 12 | 0.22 | 100 | 500 | 670 | 21.6 |

A significant reduction in corrosion was achieved with only about 31.8 ppm sodium carbonate buffer with an approximately 0.22 scf carbon dioxide charge. The corrected corrosion rate was reduced from about 72.5 mils/yr to about 9.4 mils/yr. At this carbon dioxide concentration, adding more sodium carbonate (about 100 ppm) resulted in less corrosion reduction (about 72.5 mils/yr to about 21.6 mils/yr), which was unexpected. The discrepancy could be due to the difference in run pressure between the two tests (about 670 psia for Run 12 and about 655 psia for Run 13). Also surprising was the greater corrosion which occurred using about 10 ppm sodium carbonate (about 166.4 mils/yr) than without sodium carbonate (about 72.5 mils/yr).

EXAMPLE 16

Carbon Dioxide-Stream Co-Injection Oil Recovery Test

Equipment

Manly #round grain silica sand was used in the laboratory experiment. In the following Tables III-V are presented the (a) screen and chemical analysis, (b) the sand pack and steam properties, and (c) the crude oil properties, respectively, employed in the experiment.

TABLE III

Unconsolidated Sand Properties
Sand Type: Manly 40 Round Grain Silica

| Screen Analysis | | Chemical Analysis | |
| --- | --- | --- | --- |
| ON 30 | 1% | $SiO_2$ | >99.5% |
| ON 40 | 30% | $Fe_2O_3$ | .065 |
| ON 50 | 49% | $Al_2O_3$ | .05 |
| ON 70 | 16% | $TiO_2$ | .01 |
| ON 100 | 4% | CaO | .14 |
| ON 140 | 0% | $K_2O$ | .02 |
| ON 200 | 0% | MgO | <.05 |
| | | $Cr_2O_3$ | <10 ppm |

TABLE IV

Sandpack and Steam Properties

| | |
| --- | --- |
| Weight of Sand | 37.9 lbs |
| Sandpack Porosity | 30% |
| Sandpack Permeability | 8.4 Darcies |
| Pore Volume | 3015 cc |
| Crude Oil Gravity | 11.2° API |
| Steam Rate | 2 cc/min* |
| Ave. Steam Quality | 50% |

*Cold water equivalent.

TABLE V

Properties of Crude Oil

| | |
| --- | --- |
| Gravity, API | 11.2° |
| Viscosity @ | |
| 100° F. | 4300 cp |
| 150° F. | 410 cp |
| 210° F. | 68 cp |
| RVP @ 100° F. | 6 psi |
| Sulfur | 1 to 2% |

The apparatus employed in the experiment consisted of an approximately 4-foot long, 4-inch diameter cylindrical carbon steel vessel with pressure and temperature monitoring devices and fluid injection equipment. Seven pressure/temperature taps were spaced about 6 inches apart along the length of the vessel. A thermowell at each tap extended about 1 inch into the vessel. Screens (about 100 mesh size) were installed at the inlet and outlet ports in order to prevent losses of sand from the sandpack. Screw caps at each end of the sandpack could be removed to facilitate the loading and unloading of the sand.

Water and/or other chemical injection utilized a positive displacement pump. Carbon dioxide was supplied from a gas cylinder and metered through a calibrated micrometer valve. A wet test meter was used to periodically monitor carbon dioxide flow rates. Check valves were included to prevent backflow of fluids into the carbon dioxide and chemical supply lines.

Fluids could be removed from the end of the vessel through any of 5 concentric outlet ports. All 5 ports were kept open in the experiment. The outlet pressure of the sandpack was controlled with a back pressure regulator or a manually-controlled needle valve. A condenser made of about 50 feet of coiled copper tubing was used to condense vapors from the sandpack. Fluids were collected in a receiving flask or graduated cylinder. As a precaution, in-line filters were installed upstream of the outlet back pressure regulator and the calibrated micrometer valve to trap particles.

The sandpack was wrapped evenly with heating tape and fully insulated. The temperature was regulated by 3 analog temperature controllers. Thermocouple readings were automatically scanned with a temperature scanner, then displayed on a chart recorder.

A stainless steel vessel (about 3,500 cc in volume), wrapped with heating tape and insulated, was used as a oil reservoir when saturating the sandpack with crude oil. Lines were installed so that water could be pumped up through the bottom of the reservoir, displacing the oil into the sandpack.

An auxiliary nitrogen supply system was installed so that the back pressure regulators could be dome-loaded.

Procedure

Run conditions used for the carbon dioxide-steam co-injection experiment are presented in the following Table VI.

TABLE VI

Run Conditions For $CO_2$-Steam Co-Injection Test

| | |
| --- | --- |
| OOIP[a], cc | 3,000 |
| Residual Oil Saturation to Steam, % PV | 33.8 |
| Average Temperature, °F. | 387 |
| Average Pressure, psig | 200 |
| Average Steam Rate, cc/min[b] | 2 |
| $Na_2CO_3$ Concentration in Steam, ppm | 100 |
| Average Steam Quality (est.) | 50% |
| Steam Liquid Phase Flow Rate (est.), cc/min | 1 |
| Steam Liquid Phase Linear Velocity (est.), ft/day | 2 |
| Steam Gas Phase Flow Rate (est.), cc/min | 133.3 |
| Injected $CO_2$ Flow Rate, scc/min | 20 |
| $CO_2$ Flow Rate in Sandpack (est.), cc/min | 2.2 |

[a]OOIP denotes "original oil in place."
[b]Cold water equivalent basis.

Prior to the run, the sandpack was cleaned with kerosene, acetone, water, and then dried.

The steps employed in the test included saturating the sandpack with crude oil, steam flooding to residual oil saturation to steam, adding carbon dioxide and sodium carbonate, measuring incremental recovery, and observing the termination of the incremental oil recovery.

Warm crude oil was displaced from the oil reservoir into a clean, dry sandpack using water pumped from a reservoir. The saturation procedure was continued until oil was observed at the sandpack outlet. The volume of displaced oil was recorded.

The crude-saturated sandpack was heated to about 387° F. prior to steam injection. Water was then pumped into the inlet at a rate of about 2 cc per minute to generate approximately 50 weight percent quality steam inside the sandpack. At the same time, the sandpack outlet valve was opened to release crude oil and keep the sandpack outlet pressure at about 200 psig.

The temperature controls were carefully adjusted during the run to maintain isothermal conditions across the length of the sandpack. During the run, the temperature was maintained within about ±2° F. of the steam saturation pressure. This assured two-phase steam conditions within the sandpack. A temperature about 2° F. above or below the saturation point indicated superheated or completely condensed steam, respectively.

After steam breakthrough was observed at the sandpack outlet, the condenser, and back pressure regulator were put in-line to condense steam and maintain run pressure. Steam injection was continued until the oil cut was reduced below about 0.2 volume fraction (20 volume percent). The experiment was run for about 8 hours during the day, then shut down at night, and resumed the following morning. Separate effluent samples were collected at sample intervals of about 4 to about 7 hours to determine the oil recovery rate versus the amount of liquid pore volumes injected.

The effluent samples were collected in large (about 2,000 cc) graduated cylinders. In order to break oil-in-water emulsions, about 10 percent sodium chloride salt (by weight in the aqueous phase) was added to the effluent to increase the aqueous phase density. In addition, both forward and reverse emulsion breakers were used. Finally, a volumetric ratio (about 2 to 1) of solvent-to-oil was added to thin the oil. After about 1 to about 2 days, separation was achieved by gravity, and the oil and water volumes were recorded.

After residual oil saturation to steam was achieved, sodium carbonate (about 100 ppm) was added to the steam make-up water. At the same time, continuous injection of carbon dioxide was started at a flow rate of about 20 scc/min. The carbon dioxide was added directly to the steam make-up water downstream of the injection pump. The carbon dioxide flow rate was reduced to about 2 cc/min inside the sandpack due to compression. Likewise, the steam gas-phase flow rate was about 133 cc/min and the liquid-phase flow rate was about 1 cc/min inside the sandpack (assuming a steam quality of about 50 weight percent).

The steam injection rate was controlled by timing the drainage of water from the chemical/water reservoir and adjusting the pump speed. The carbon dioxide flow rate was determined by directing flow through a back-pressure regulator followed by a wet test meter. The injection of carbon dioxide, sodium carbonate, and steam was continued until the oil cut fell below about 0.2 volume fraction.

Discussion of Results

The run data obtained during the carbon dioxide-steam co-injection test are presented in Table VII, infra.

In Table VII, volumes of oil and water collected over each sample interval are shown in addition to the calculated oil recovery rates and oil cuts.

In the sole figure, the oil recovery rate is plotted versus the pore volumes of the injected steam liquid phase. Initially, the oil recovery rate was high as the majority of the crude oil was displaced by steam injection. After about 0.2 pore volume was injected, the oil recovery rate dropped off sharply. Residual oil saturation to steam was reached after the injection of about 0.9 pore volume steam liquid phase. The oil recovery rate increased substantially (from about 1.3 cc/hr to about 20 cc/hr) immediately after the start of the carbon dioxide addition to steam. Residual oil saturation to carbon dioxide-steam was achieved at about 1.9 pore volumes, after a period of gradual decline in oil recovery.

For comparison purposes, a steam-foam run was conducted using the same experimental conditions as were used in the carbon dioxide-steam test with the exceptions that (a) no carbon dioxide or sodium carbonate was used and (b) a surfactant (alpha-olefin sodium sulfonate [AOS]) was added to the steam make-up water, resulting in an injected concentration of about 0.5 weight percent active surfactant. In addition, in the steam-foam run, nitrogen was simultaneously injected at a rate of about 5 scc/minute to generate the steam-foam. The comparison between the carbon dioxide-steam and steam-foam runs is based on the injection of equal volumes of steam-liquid phase (about 0.72 pore volume) after achieving residual oil saturation to steam. Less incremental oil was recovered in the carbon dioxide-steam run than in the steam-foam run (about 302.7 cc versus about 355 cc, respectively). Furthermore, a more gradual displacement of oil was measured in the carbon dioxide-steam run than in the steam-foam run.

The results of the carbon dioxide-steam tests are compared to the steam-foam results in the following Table VIII.

TABLE VIII

| Comparative Experiment Results | | |
|---|---|---|
|  | $CO_2$-Steam | Steam-Foam |
| Total Incremental Oil Recovery, cc | 302.7 | 355 |
| Total Incremental | 10.1 | 11.8 |

TABLE VII

Steam-$CO_2$ Co-Injection Experiment

| Hours from Start of Run[a] | Cumulative Liquid Injected, Pore Volumes | Sample Interval, hrs | Sample Oil Volume, cc | Oil Recovery Rate, cc/hr | Sample Water Volume, cc | Oil Cut, Fraction Percent |
|---|---|---|---|---|---|---|
| 2.75[b] | 0.055 | 5.5 | 885 | 160.9 | 55 | 0.941 |
| 8.17 | 0.218 | 5.33 | 560 | 105 | 450 | 0.554 |
| 15.46 | 0.309 | 9.25 | 300 | 32.4 | 710 | 0.297 |
| 24.33 | 0.487 | 8.50 | 140 | 16.5 | 1,000 | 0.123 |
| 32.33 | 0.647 | 7.50 | 60 | 8 | 900 | 0.063 |
| 39.08 | 0.782 | 6.00 | 31 | 5.2 | 527 | 0.056 |
| 45.83 | 0.917 | 7.50 | 10 | 1.3 | 440 | 0.020 |
| 52.08[c] | 1.042 | 5.00 | 100 | 20 | 1,260 | 0.074 |
| 56.83 | 1.137 | 9.50 | 84 | 8.84 | 1,020 | 0.054 |
| 67.21 | 1.344 | 6.25 | 30 | 4.8 | 530 | 0.045 |
| 74.08 | 1.482 | 7.50 | 53 | 7.07 | 1,130 | 0.045 |
| 81.33 | 1.627 | 7.00 | 33 | 4.71 | 720 | 0.044 |
| 88.21 | 1.764 | 6.75 | 18 | 2.67 | 657 | 0.027 |
| 94.96 | 1.899 | 6.75 | 7 | 1.04 | 680 | 0.010 |

[a] At mid-point of sample interval.
[b] Start of steam flood.
[c] Carbon dioxide and sodium bicarbonate added.

TABLE VIII-continued

| Comparative Experiment Results | | |
|---|---|---|
| | CO$_2$-Steam | Steam-Foam |
| Oil Recovery, % OOIP | | |
| Steam Liquid Phase | | |
| Volume Injected | | |
| During Steamflood, cc | 5,949 | 4,080 |
| During Steamflood, PV | .99 | .68 |
| During Foam or CO$_2$ Injection, cc | 4,300 | 4,367 |
| During Foam or CO$_2$ Injection, PV | .72 | .72 |
| Process Chemical Cost, $/bbl | | |
| Surfactant (AOS @ $0.19/lb 30% active) | | 5.54 |
| Nitrogen (@ $5.50/MCF) | | .76 |
| CO$_2$ (@ $1.00 to 2.00/MCF) | 0.81 to 1.62 | |
| Na$_2$CO$_3$ (@ $0.06/lb) | .03 | |
| Total | $0.84 to 1.65 | $6.30 |

Although less oil was recovered in the carbon dioxide-steam run than in the steam-foam run (about 10.1% OOIP versus about 11.8% OOIP, respectively), the process economics of carbon dioxide-steam are more favorable. In particular, assuming about one dollar to about two dollars per mcf for carbon dioxide and about $0.06 per pound for sodium carbonate, the process chemical costs for the carbon dioxide-steam run range between about $0.84 and about $1.65 per barrel of recovered oil. By comparison, the cost of surfactant and nitrogen in the steam-foam run was estimated to be about $6.30.

EXAMPLES 17-25

BUFFER SOLUTION RATE CALCULATION

The following calculations can be used to determine the rate of buffer agent injection into a steam stream having a known steam rate, a known steam quality, and a given carbon dioxide addition rate. These calculations are suitable for use with steam generated from feedwater having a low total dissolved salt content.

The following illustrative calculations use the steam rate, steam quality, and carbon dioxide dosage rate provided below in Table IX for Example 17 to generate the other information provided in Table IX for Example 17. Similar calculations, not shown, were based upon the steam rate, steam quality, and carbon dioxide dosage rate shown in Table IX for Examples 18-25 to generate the remaining numbers set forth in Table IX.

A. Calculation of CO$_2$ to Steam Liquid Phase Ratio

First, determine the amount of the steam liquid phase using the following equation:

$$\text{Steam Liquid Phase, bbl/day} = \frac{(\text{Steam Rate, bbl/day})(100\% - \text{Steam Quality, \%})}{100\%}$$

For Example 17, the steam rate is 100 bbl/day and the steam quality is 90 weight percent. Accordingly, the steam liquid phase for Example 17 is $$\text{Steam Liquid Phase, bbl/day} = \frac{(100 \text{ bbl/day})(100\% - 90\%)}{100\%}$$
$$= 10 \text{ bbl/day}$$

For a carbon dioxide dosage rate of 5,600 scf/day, the ratio of carbon dioxide to steam liquid phase is (5,600 scf/day)/(10 bbl/day) = 560 scf/bbl.

B. Calculation of Carbon Dioxide Solubility

The concentration of the carbon dioxide soluble in the steam liquid phase is calculated using the following formulas:

$$K_g \text{ (Henry's Law Coefficient)} = p_w/Az_w \text{ and}$$

$$A \text{ (Distribution Coefficient)} = (n_g^l/n_w^l)/(n_g^v/n_w^v),$$

wherein
$p_w$ is the saturated steam vapor pressure,
$z_w$ is the compressibility factor for steam $(z_w = p_w V/RT)$,
V is the volume per pound mole,
R is the universal gas constant,
T is the absolute temperature in °R.,
$n_g^l$ is the mole fraction of carbon dioxide in the steam liquid phase,
$n_g^v$ is the mole fraction of carbon dioxide in the steam vapor phase,
$n_w^l$ is the mole fraction of steam which is a liquid phase, and
$n_w^v$ is the mole fraction of steam which is a vapor phase.

For an assumed steam temperature of about 400° F., the $p_w$ and V are determined from a steam table to be about 250 psi and (1.863 ft$^3$/lb$_m$)(18 lb$_m$/lb$_{mole}$). Accordingly, by substituting into the formula for $z_w$ gives $$z_w = \frac{(250 \text{ psi})(1.863 \text{ ft}^3/\text{lb}_m)(18 \text{ lb}_m/\text{lb}_{mole})}{(10.73 \text{ psi ft}^3/\text{lb}_{mole} °\text{R.})(860° \text{ R.})}$$
$$= 0.9085$$

The $n_w^l$ and $n_w^v$ for Example 17 are 0.1 and 0.9, respectively. From FIG. 2 of Ellis et al, supra at 51, the $K_g$ for water at about 400° F. is about 6,000. Substitution into the formula $$K_g = p_w/Az_w$$

yields $$6,000 = 250 \text{ psi}/A(0.9085)$$

and A, therefore, equals 0.0459.

Using the above numbers for A, $n_w^l$, and $n_w^v$ in the formula $A = (n_g^l/n_w^l)/(n_g^v/n_w^v)$ gives $$0.0459 = (n_g^l/0.1)/(n_g^v/0.9) \text{ or}$$

$$n_g^l = 0.0051 n_g^v.$$

In Example 17 where the carbon dioxide-steam liquid phase ratio is about 560 scf CO$_2$/bbl steam liquid phase, $$n_g^l = 0.0051(560 \text{ scf CO}_2/\text{bbl steam liquid phase})$$
$$= 2.86 \text{ scf CO}_2/\text{bbl steam liquid phase.}$$

In other words, 2.86 scf of carbon dioxide are soluble per barrel of steam or under the conditions of Example 17. Converting to pound moles carbon dioxide per pound mole steam liquid phase yields 0.000468 pound mole carbon dioxide per pound mole steam liquid phase, and converting to gram moles carbon dioxide per liter of steam liquid phase yields 0.026 gram moles carbon dioxide per liter steam liquid phase.

Calculation of pH of Carbon Dioxide-Steam Mixture Before Buffering Agent Addition As noted above, only about 0.37 percent of the carbon dioxide present in the steam liquid phase is actually carbonic acid. Therefore, the carbonic acid concentration in the steam liquid phase of Example 17 is $$\frac{(0.0037 \text{ g mole carbonic acid})(0.026 \text{ g moles } CO_2)}{(\text{g mole carbon dioxide})(\text{liter steam liquid phase})} =$$

0.000096 moles carbonic acid/liter steam liquid phase

The pH of the steam liquid phase is determined using the formula $$[H_3O^+] = ([H_2CO_3]K_1)^{0.5}$$

where $K_1$ equals $4.2 \times 10^{-7}$. Substituting into the above formula and solving yields $$[H_3O^+] = ([0.000096M\ H_2CO_3]4.2 \times 10^{-7})^{0.5} = 6.35 \times 10^{-6}$$

whose negative logarithm, and therefore pH, is 5.2. Accordingly, the pH of the steam liquid phase in Example 17 is about 5.2 prior to the addition of a buffering agent.

D. Calculation of Amount of Buffering Agent Required to Form a Stoichiometric Buffer Solution The concentration of $H_3O^+$ in a buffer solution of carbonic acid and a carbonate-containing compound is represented by the equation $[H_3O^+] = [H_2CO_3]K_1/[HCO_3^-]$. Therefore, a stoichiometric buffer solution requires the presence of equal molar concentrations of carbonic acid and $HCO_3^-$ ions. In the case of sodium carbonate and sodium bicarbonate, a stoichiometric buffer solution requires the presence of equal molar concentrations of carbonic acid and one of these buffering agents.

In Example 17, 10 barrels (or 420 gallons) per day of steam liquid phase is being injected into the well and the concentration of carbon dioxide in the steam liquid phase is 0.000468 pound mole carbon dioxide per pound mole of steam liquid phase. Accordingly, the carbonic acid concentration in the steam liquid phase is 0.00000173 pound mole carbonic acid per pound mole of steam liquid phase. To form a stoichiometric buffer solution with either sodium carbonate or sodium bicarbonate requires the steam liquid phase comprise 0.00000173 pound mole of one of these buffering agents per pound mole of steam liquid phase. For a 1 molar solution of either of these buffering agents, the volume per hour of the solution necessary to maintain a stoichiometric buffer solution concentration in the steam-carbon dioxide mixture is about 0.00139 gallons per hour. To maintain a 200% stoichiometric buffer solution concentration in the steam-carbon dioxide mixture requires double this injection rate or 0.00278 gallons per hour as noted in Table IX.

E. Calculation of pH of Carbon Dioxide-Steam Mixture After Buffering Agent Addition The pH of the carbon dioxide-steam mixture after the addition of the buffering agent is calculated using the equation shown in section D, supra, and taking the negative logarithm of $[H_3O^+]$.

TABLE IX

| Run | Steam Rate, $BPD^a$ | Steam Quality, Wt. % | $CO_2$ Dose, SCF/day | $CO_2$/Steam Liquid Phase, SCF/BBL | g mole Soluble $CO_2$/g mole Steam Liquid Phase | pH w/o $BA^b$ | BA Injection Rate$^c$, gal/hr | pH with BA |
|---|---|---|---|---|---|---|---|---|
| 17 | 100 | 90 | 5,600 | 560 | 0.000468 | 5.2 | 0.00278 | 6.68 |
| 18 | 100 | 10 | 5,600 | 62.2 | 0.00299 | 4.8 | 0.161 | 6.68 |
| 19 | 100 | 90 | 28,000 | 2800 | 0.00234 | 4.9 | 0.014 | 6.68 |
| 20 | 100 | 10 | 28,000 | 311.1 | 0.0150 | 4.4 | 0.803 | 6.68 |
| 21 | 1000 | 90 | 56,000 | 560 | 0.000468 | 5.2 | 0.0278 | 6.68 |
| 22 | 1000 | 10 | 56,000 | 62.2 | 0.00299 | 4.8 | 1.61 | 6.68 |
| 23 | 1000 | 90 | 280,000 | 2800 | 0.00234 | 4.9 | 0.14 | 6.68 |
| 24 | 1000 | 10 | 280,000 | 311.1 | 0.0150 | 4.4 | 8.03 | 6.68 |
| 25 | 500 | 50 | 70000 | 280 | 0.00203 | 4.9 | 0.44 | 6.68 |

$^a$Cold water equivalent.
$^b$BA denotes "buffering agent" ($Na_2CO_3$).
$^c$1M $Na_2CO_3$ or $NaHCO_3$ solution necessary to maintain a 200% stoichiometric buffer solution concentration.

Although the present invention has been described in considerable detail with reference to some preferred versions throughout, other versions are possible. For example, the composition can be employed in enhanced oil recovery procedures other than those discussed above and when employed in such procedures can include other optional ingredients for increasing the efficacy of the composition in these latter procedures. Nevertheless, while the composition can optionally contain ingredients other than steam, carbon dioxide, carbonic acid, and a corrosion inhibitor, the composition preferably consists essentially of just these ingredients. Therefore, the spirit and scope of the appended claims should not necessarily be limited to the description of the preferred versions contained herein.

What is claimed is:

1. A process for reducing corrosion of well tubing while recovering oil from an oil-bearing formation using a carbon dioxide-steam co-injection method, the process comprising the steps of:
   (a) heating feedwater to generate steam;
   (b) injecting a carbonate-containing pH adjusting agent into the steam to form a pH adjusting agent-containing steam;
   (c) injecting carbon dioxide into the pH adjusting agent-containing steam to form an enhanced oil recovery composition having a pH of about 6.3 to less than 7.5;

(d) injecting the enhanced oil recovery composition into at least a portion of an oil-bearing formation; and (e) withdrawing oil from the formation.

2. The process of claim 1 wherein the enhanced oil recovery composition has a pH of about 6.3 to about 7.

3. The process of claim 1 wherein the enhanced oil recovery composition has a pH of about 6.3 to about 6.7.

4. The process of claim 1 wherein the enhanced oil recovery composition has a pH of about 6.3 to about 6.4.

5. The process of claim 1 wherein step (b) includes the step of injecting a sufficient amount of the carbonate-containing pH adjusting agent into the steam for the pH adjusting agent-containing steam to have a carbonate-containing pH adjusting agent concentration of at least about 500 ppm.

6. The process of claim 1 wherein step (b) includes the step of injecting a sufficient amount of a carbonate-containing pH adjusting agent into the steam for the pH adjusting agent-containing steam to have a carbonate-containing buffering agent concentration of at least about 500 ppm, the enhanced oil recovery composition having a pH of about 6.3 to about 7.

7. The process of claim 1 wherein step (b) includes the step of injecting a sufficient amount of a carbonate-containing pH adjusting agent into the steam for the pH adjusting agent-containing steam to have a carbonate-containing buffering agent concentration of at least about 500 ppm, the enhanced oil recovery composition having a pH of about 6.3 to about 6.7.

8. The process of claim 1 wherein step (b) includes the step of injecting a sufficient amount of a carbonate-containing pH adjusting agent into the steam for the pH adjusting agent-containing steam to have a carbonate-containing buffering agent concentration of at least about 500 ppm, the enhanced oil recovery composition having a pH of about 6.3 to about 6.4.

9. A process for reducing corrosion of well tubing while recovering oil from an oil-bearing formation using a carbon dioxide-steam co-injection method, the process comprising the steps of:

(a) injecting a carbonate-containing pH adjusting agent into the feedwater to form a pH adjusting agent-containing feedwater, (b) heating the pH adjusting agent-containing feedwater to generate steam having a liquid phase and a vapor phase, (c) injecting carbon dioxide into the steam to form an enhanced oil recovery composition having a pH of about 6.3 to less than 7.5, (d) injecting the enhanced oil recovery composition into at least a portion of an oil-bearing formation, and (e) withdrawing oil from the formation.

10. The process of claim 9 wherein the enhanced oil recovery composition has a pH of about 6.3 to about 7.

11. The process of claim 9 wherein the enhanced oil recovery composition has a pH of about 6.3 to about 6.7.

12. The process of claim 9 wherein the enhanced oil recovery composition has a pH of about 6.3 to about 6.4.

13. The process of claim 9 wherein step (a) includes the step of injecting a sufficient amount of the carbonate-containing pH adjusting agent into the feedwater for the pH adjusting agent-containing feedwater to have a carbonate-containing pH adjusting agent concentration of at least about 500 ppm.

14. The process of claim 9 wherein step (a) includes the step of injecting a sufficient amount of a carbonate-containing pH adjusting agent into the feedwater for the pH adjusting agent-containing feedwater to have a carbonate-containing buffering agent concentration of at least about 500 ppm, the enhanced oil recovery composition having a pH of about 6.3 to about 7.

15. The process of claim 9 wherein step (a) includes the step of injecting a sufficient amount of a carbonate-containing pH adjusting agent into the feedwater for the pH adjusting agent-containing feedwater to have a carbonate-containing buffering agent concentration of at least about 500 ppm, the enhanced oil recovery composition having a pH of about 6.3 to about 6.7.

16. The process of claim 9 wherein step (a) includes the step of injecting a sufficient amount of a carbonate-containing pH adjusting agent into the feedwater for the pH adjusting agent-containing feedwater to have a carbonate-containing buffering agent concentration of at least about 500 ppm, the enhanced oil recovery composition having a pH of about 6.3 to about 6.4.

17. A process for reducing corrosion of well tubing while recovering oil from an oil-bearing formation using a carbon dioxide-steam co-injection method, the process comprising the steps of:

(a) heating feedwater to generate steam having a liquid phase and a vapor phase, (b) injecting carbon dioxide into the steam to form a carbon dioxide-containing steam, (c) injecting a carbonate-containing pH adjusting agent into the carbon dioxide-containing steam to form an enhanced oil recovery composition having a pH of about 6.3 to less than 7.5, (d) injecting the enhanced oil recovery composition into at least a portion of an oil-bearing formation, and (e) withdrawing oil from the formation.

18. The process of claim 17 wherein the enhanced oil recovery composition has a pH of about 6.3 to about 7.

19. The process of claim 17 wherein the enhanced oil recovery composition has a pH of about 6.3 to about 6.7.

20. The process of claim 17 wherein the enhanced oil recovery composition has a pH of about 6.3 to about 6.4.

21. The process of claim 17 wherein step (c) includes the steps of injecting a sufficient amount of the carbonate-containing pH adjusting agent into the carbon dioxide-containing steam for the enhanced oil recovery composition to have a carbonate-containing pH adjusting agent concentration of at least about 500 ppm.

22. The process of claim 17 wherein step (c) includes the step of injecting a sufficient amount of a carbonate-containing pH adjusting agent into the carbon dioxide-containing steam for the enhanced oil recovery composition to have a carbonate-containing pH adjusting agent concentration of at least about 500 ppm and a pH about 6.3 to about 7.

23. The process of claim 17 wherein step (c) includes the step of injecting a sufficient amount of a carbonate-containing pH adjusting agent into the carbon dioxide-containing steam for the enhanced oil recovery composition to have a carbonate-containing pH adjusting agent concentration of at least about 500 ppm and a pH about 6.3 to about 6.7.

24. The process of claim 17 wherein step (c) includes the step of injecting a sufficient amount of a carbonate-containing pH adjusting agent into the carbon dioxide-containing steam for the enhanced oil recovery composition to have a carbonate-containing pH adjusting agent concentration of at least about 500 ppm and a pH about 6.3 to about 6.4.

25. A process for reducing corrosion of well tubing while recovering oil from an oil-bearing formation using a carbon dioxide-steam co-injection method, the process comprising the steps of:
(a) heating feedwater to generate steam having a liquid phase and a vapor phase,
(b) substantially simultaneously injecting (i) a carbonate-containing pH adjusting agent and (ii) carbon dioxide into the steam to form an enhanced oil recovery composition having a pH of about 6.3 to less than 7.5.
(c) injecting the enhanced oil recovery composition into at least a portion of an oil-bearing formation, and
(d) withdrawing oil from the formation.

26. The process of claim 25 wherein the enhanced oil recovery composition has a pH of about 6.3 to about 7.

27. The process of claim 25 wherein the enhanced oil recovery composition has a pH of about 6.3 to about 6.7.

28. The process of claim 25 wherein the enhanced oil recovery composition has a pH of about 6.3 to about 6.4.

29. The process of claim 25 wherein step (b) includes the step of injecting a sufficient amount of the carbonate-containing pH adjusting agent into the steam for the enhanced oil recovery composition to have a carbonate-containing pH adjusting agent concentration of at least about 500 ppm.

30. The process of claim 25 wherein step (b) includes the step of injecting a sufficient amount of a carbonate-containing pH adjusting agent into the steam for the enhanced oil recovery composition to have a carbonate-containing pH adjusting agent concentration of at least about 500 ppm and a pH about 6.3 to about 7.

31. The process of claim 25 wherein step (b) includes the step of injecting a sufficient amount of a carbonate-containing pH adjusting agent into the steam for the enhanced oil recovery composition to have a carbonate-containing pH adjusting agent concentration of at least about 500 ppm and a pH about 6.3 to about 6.7.

32. The process of claim 25 wherein step (b) includes the step of injecting a sufficient amount of a carbonate-containing pH adjusting agent into the steam for the enhanced oil recovery composition to have a carbonate-containing pH adjusting agent concentration of at least about 500 ppm and a pH about 6.3 to about 6.4.

* * * * *